United States Patent
Kato et al.

(10) Patent No.: US 6,860,324 B2
(45) Date of Patent: Mar. 1, 2005

(54) HEAT EXCHANGER

(75) Inventors: Soichi Kato, Saitama (JP); Shoji Akiyama, Saitama (JP)

(73) Assignee: Zexel Valeo Climate Control Corporation, Saitama (JP)

( * ) Notice: Subject to any disclaimer, the term of this patent is extended or adjusted under 35 U.S.C. 154(b) by 0 days.

(21) Appl. No.: 10/466,917

(22) PCT Filed: Jan. 23, 2002

(86) PCT No.: PCT/JP02/00477
§ 371 (c)(1),
(2), (4) Date: Jul. 23, 2003

(87) PCT Pub. No.: WO02/061361
PCT Pub. Date: Aug. 8, 2002

(65) Prior Publication Data
US 2004/0069478 A1 Apr. 15, 2004

(30) Foreign Application Priority Data
Jan. 29, 2001 (JP) ........................ 2001-020281

(51) Int. Cl.[7] .............................................. F28F 9/16
(52) U.S. Cl. .................. 165/178; 29/890.054
(58) Field of Search ................ 165/178, 173; 29/890.054

(56) References Cited

U.S. PATENT DOCUMENTS

| | | | | |
|---|---|---|---|---|
| 5,163,716 A | * | 11/1992 | Bolton et al. ................ | 165/173 |
| 5,271,460 A | * | 12/1993 | O'Brien ...................... | 165/178 |
| 5,280,971 A | * | 1/1994 | Tokutake et al. ............ | 165/178 |
| 5,346,003 A | * | 9/1994 | Halstead et al. ............. | 165/173 |
| 5,363,910 A | * | 11/1994 | Baba et al. .................. | 165/153 |
| 5,379,834 A | * | 1/1995 | Tokutake ..................... | 165/178 |
| 5,711,370 A | * | 1/1998 | Tanaka ........................ | 165/178 |
| 5,911,274 A | * | 6/1999 | Inaba et al. ................. | 165/178 |
| 5,941,304 A | * | 8/1999 | Inaba et al. ................. | 165/178 |
| 5,975,193 A | * | 11/1999 | Tokita et al. ............... | 165/178 |
| 6,065,534 A | * | 5/2000 | Sircar ......................... | 165/178 |
| 6,347,663 B1 | * | 2/2002 | Hunzinger et al. ......... | 165/178 |
| 6,443,223 B2 | * | 9/2002 | Ichiyanagi .................. | 165/178 |

* cited by examiner

Primary Examiner—Leonard R. Leo
(74) Attorney, Agent, or Firm—Takeuchi & Takeuchi (57) ABSTRACT

A heat exchanger for performing heat exchange of a medium by heat conducted to tubes (210) and fins (220), the heat exchanger is configured by assembling the tubes, the fins, tanks (300) and a connector (400) and heating them in a furnace to be brazed into one body, wherein the connector is made of aluminum or its alloy and has a seating face to be brazed to the outer surface of the tank, and when it is determined that the connector has a surface area of X [$cm^2$] and a volume of Y [$cm^3$], they have a relation of $X \geq 1.5 \cdot (36\pi Y^2)^{1/3}$, $Y \leq 30$.

4 Claims, 7 Drawing Sheets

HEAT EXCHANGER

TECHNICAL FIELD

The present invention relates to a heat exchanger which is comprised of tubes for flowing a medium, fins attached to the tubes, tanks to which ends of the tubes are connected, and connectors disposed on the tanks, and performs heat exchange of the medium by heat conducted to the tubes and the fins.

BACKGROUND ART

A heat exchanger such as a condenser of a refrigeration cycle or a radiator of automobiles is configured by alternately stacking a plurality of tubes and a plurality of fins to form a core and connecting ends of the tubes to the tanks. A medium is introduced into the inside through one of connectors disposed on the tank, flowned through the tubes while performing heat exchange with heat conducted to the core, and discharged to the outside from the other connector disposed on the tank.

Generally, this type of heat exchanger is produced by assembling the tubes, fins, tanks and connectors and heating the assembly to braze into one body in a furnace. And, to braze in the furnace, a brazing material and flux are previously disposed on required potions of the respective members.

To heat in the furnace, it is important that the respective members are heated as uniformly as possible so to braze the entire heat exchanger uniformly.

In this connection, the connectors have a disadvantage that heat conduction is quite slow and it takes time to braze as compared with the tubes and the fins which are formed to be thin.

The present invention was achieved in view of the above-described circumstances, and an object of the invention is to provide a heat exchanger which can have the connectors brazed efficiently.

DISCLOSURE OF THE INVENTION

The invention described in claim 1 is a heat exchanger which comprises tubes for flowing a medium, fins mounted on the tubes, tanks to which the ends of the tubes are connected and connectors disposed on the tanks, and performs heat exchange of the medium by heat conducted to the tubes and the fins, wherein the heat exchanger is formed by assembling the tubes, the fins, the tanks and the connectors and heating them in a furnace to braze into one body, the connectors are made of aluminum or its alloy and having a seating face to be brazed to the outer surface of the tanks, and when it is assumed that the connectors have a surface area of X [cm$^2$] and a volume of Y [cm$^3$], they are:

$$X \geq 1.5 \cdot (36\pi Y^2)^{1/3} \quad (1)$$

$$Y \leq 30 \quad (2)$$

and, the connectors are brazed efficiently by configuring as described above. Its concept will be described below.

First, the connectors conduct heat very slowly as compared with the tubes and the fins which are formed thin, so that heat transmission is improved by securing a large surface area against a volume.

Here, when it is assumed that a certain object has a surface area X and a volume Y, a shape having minimum X against Y is a sphere. And, when it is assumed that the sphere has a radius r, they are in the following relationship:

$$X = 4\pi r^2 \quad (3)$$

$$Y = 4\pi r^3/3 \quad (4)$$

when r is removed from the expressions (3) and (4), the result is:

$$x = (36\pi Y^2)^{1/3} \quad (5)$$

where, $\pi$ is the ratio of the circumference of a circle to its diameter.

And, the present invention determines the surface areas of the connectors to 1.5 times or more a sphere based on the surface area of the sphere having a volume equal to that of the connectors as a standard. Therefore, the surface area of the connector is 1.5 times or more the right side of the expression (5) and indicated by the expression (1).

The upper limit of the volume of the connector is determined to be 30 [cm$^3$] as indicated by the expression (2). Specifically, the surface area is proportional to the square of the diameter, and the volume is proportional to the cube of the diameter. Therefore, brazing of the connector becomes disadvantageous as its volume becomes larger. Thus, the volume of the connector is determined to have the above-described upper limit to adequately secure the brazing property.

When it is assumed that one side of a cube is a, the surface area and the volume have the following relationship:

$$X = 6a^2 \quad (6)$$

$$Y = a^3 \quad (7),$$

and when a is removed from the expressions (6) and (7), the result is $$X = 6Y^{2/3} \quad (8).$$

According to the expressions (5) and (8), the surface area of the cube becomes approximately 1.24 times that of a sphere having the same volume.

In addition, this type of conventional connector, namely a connector having a seating face to be brazed to the outer surface of the tank, having a volume of 30 [cm$^3$] or less, was sampled in plurality of types, and the samples were measured for a ratio of surface area against those of spheres having the same volumes. It was found that the ratios of surface area were somewhat larger than the above-described 1.24 times, namely approximately 1.3 to 1.45 times.

Specifically, the numerical value 1.5 times or more the expression (1) is determined considering the conventional connector, and it falls in a range to improve the heat transmission of the connector without fail. And, such a numerical value is considered to be more preferably 1.8 times or more.

Figure 7:
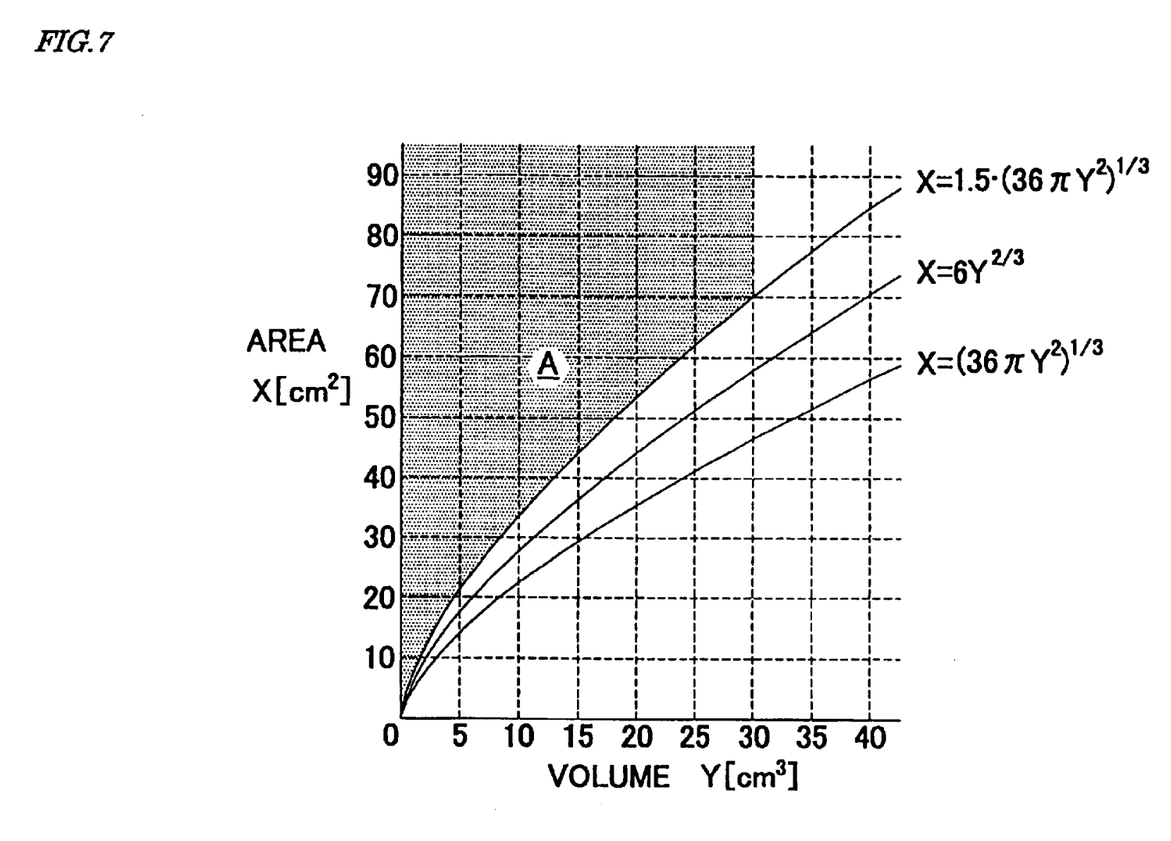
FIG. 7 is a correlation graph of a surface area and a volume.

FIG. 7 is a correlation graph of a surface area and a volume. In the drawing, values of a surface area and a volume of the connector according to the invention are indicated in a hatched area A.

The connector is provided with a pipe section which is protruded from the seating face for insertion into the tank.

By configuring as described above, the connector is accurately disposed by inserting the pipe section into the tank.

The connector is provided with a bolt-attaching section for screwing or inserting a bolt for connection of an outer passage.

By configuring as described above, the connector and the outer passage are connected with a bolt, and airtightness and support strength are secured without fail.

BEST MODE FOR CARRYING OUT THE INVENTION

Embodiments of the present invention will be described in detail below with reference to the accompanying drawings.

Figure 1:
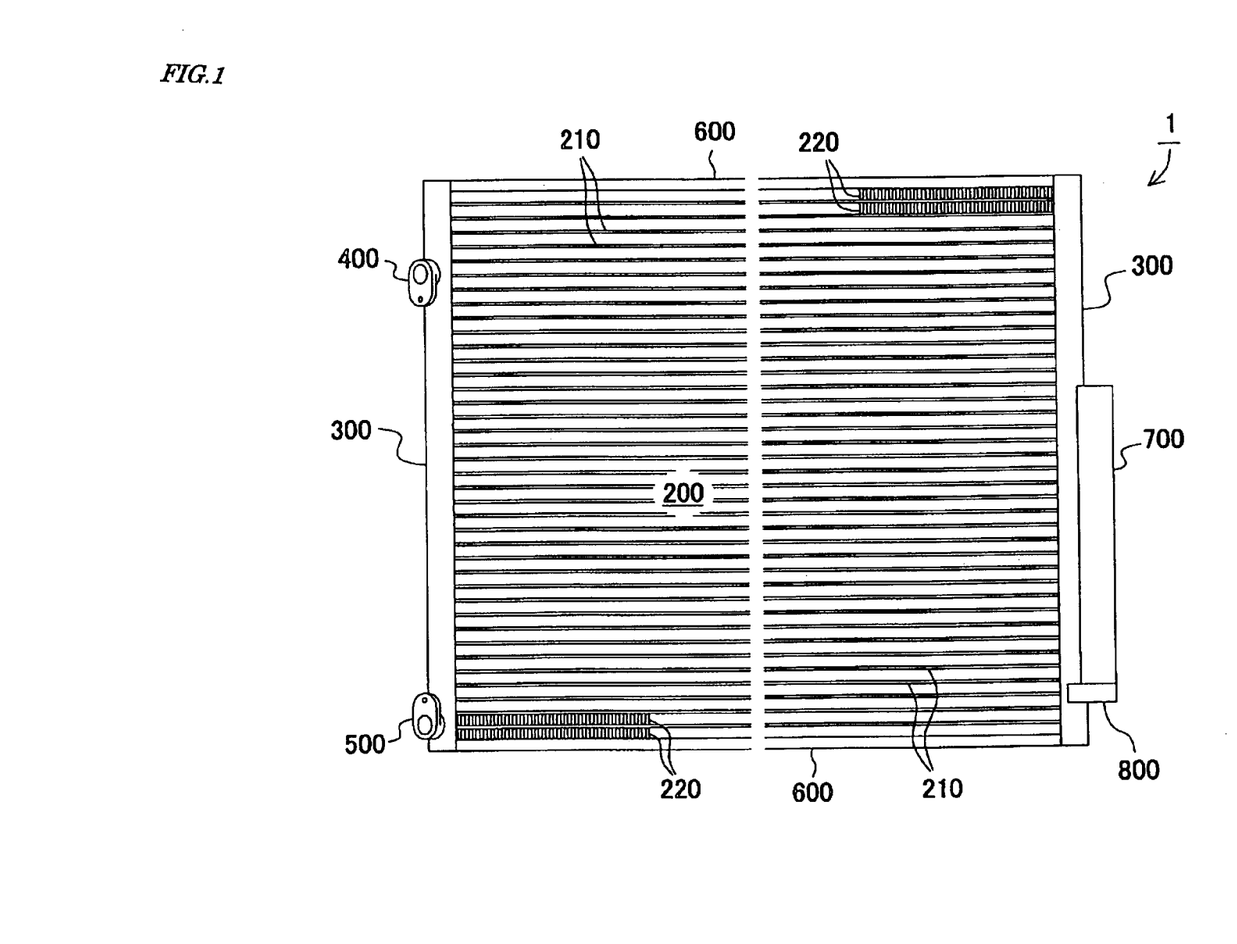
FIG. 1 is a front view showing a heat exchanger according to an embodiment of the invention.

A heat exchanger 1 of this embodiment is a radiator of a refrigeration cycle for car air conditioner mounted on automobiles and provided with a core 200 formed by alternately stacking a plurality of tubes 210 for flowing a medium (namely a refrigerant) and a plurality of fins 220 and a pair of tanks 300 to which both ends of the tubes 210 are connected as shown in FIG. 1 to perform heat exchange of the medium by heat conducted to the core 200.

Such a refrigeration cycle is to circulate a CFC-based medium and provided with a compressor for compressing the medium, a radiator for cooling the compressed refrigerant, an expansion valve for decompressing the cooled refrigerant, and an evaporator for evaporating the decompressed refrigerant. Specifically, the heat exchanger 1 of this embodiment as the radiator is a condenser which cools the medium and condenses from a gas layer to a liquid layer.

The tanks 300 are provided with an inlet connector 400 for introducing the medium and an outlet connector 500 for discharging the medium.

The medium is flowed into the tank 300 through the inlet connector 400, flowed through the tubes 210 while performing heat exchange and discharged to the outside of the tank 300 through the outlet connector 500.

The respective tanks 300 are divided their interiors at prescribed intervals, so that the medium is made to reciprocate a plurality of times between the tanks 300.

A side plate 600 is disposed as a reinforcing member on the top and bottom sides of the core 200. Ends of the respective side plates 600 are supported by the tanks 300.

Besides, one of the tanks 300 is provided with a gas-liquid separator 700. The medium, while flowing from the inlet connector 400 to the outlet connector 500, is first sent from the tank 300 to the gas-liquid separator 700 and only the liquid layer is sent to the outlet 500.

The tank 300 and the gas-liquid separator 700 are mutually connected via a connector 800 for connection of the gas-liquid separator which is disposed on the side of the tank 300.

The tubes 210, fins 220, tanks 300, inlet connector 400, outlet connector 500 and side plates 600 configuring the heat exchanger 1 are formed of aluminum or aluminum alloy, and such members are assembled and the assembly is heated in a furnace to form one body. The brazing material clad and flux are previously applied to the necessary portions of the respective members.

Especially, the tubes 210 of this embodiment are formed to be flat by extrusion forming or roll forming of a plate. Their insides are divided into a plurality of sections in order to obtain the required pressure resistance.

Figure 2:
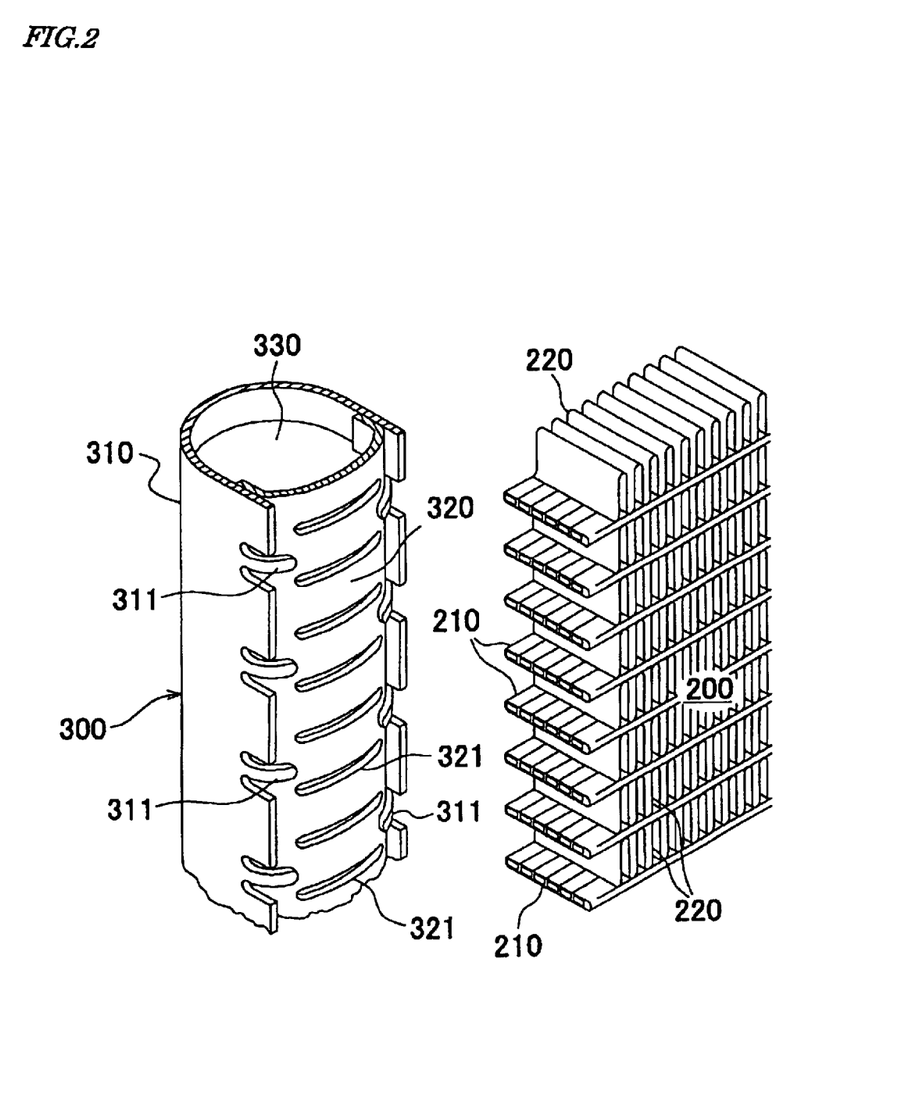
FIG. 2 is an exploded perspective view showing a tank and a core according to the embodiment of the invention.

The tanks 300 of this embodiment each is configured by assembling a tank plate 310 and an end plate 320 as shown in FIG. 2.

The tank plate 310 and the end plate 320 are formed by press-forming a plate of aluminum or aluminum alloy having a prescribed thickness.

The tank plate 310 is a semicircular cylindrical member, and the end plate 320 is a member provided with holes 321 into which the ends of the tubes 210 are inserted for connection. The holes 321 of the end plate 320 are disposed in plural numbers at prescribed intervals along the longitudinal direction of the end plate 320.

Partition plates 330 are disposed between the tank plate 310 and the end plate 320 with prescribed intervals. Specifically, the ends and interior of the tank 300 are closed and divided by the partition plates 330.

In this embodiment, the tank plate 310 and the end plate 320 are assembled with the end plate 320 fitted to both edges of the tank plate 310. And, both edges of the end plate 320 are brazed to the inner periphery of the tank plate 310.

Besides, edges 310a of the tank plate 310 are formed a plurality of bending pieces 311 for holding the end plate 320 with appropriate intervals.

The end plate 320 is positioned on the tank plate 310 and fixed by bending the bending pieces 311. The bending pieces 311 are bent by a caulking jig or the like.

Figure 3:
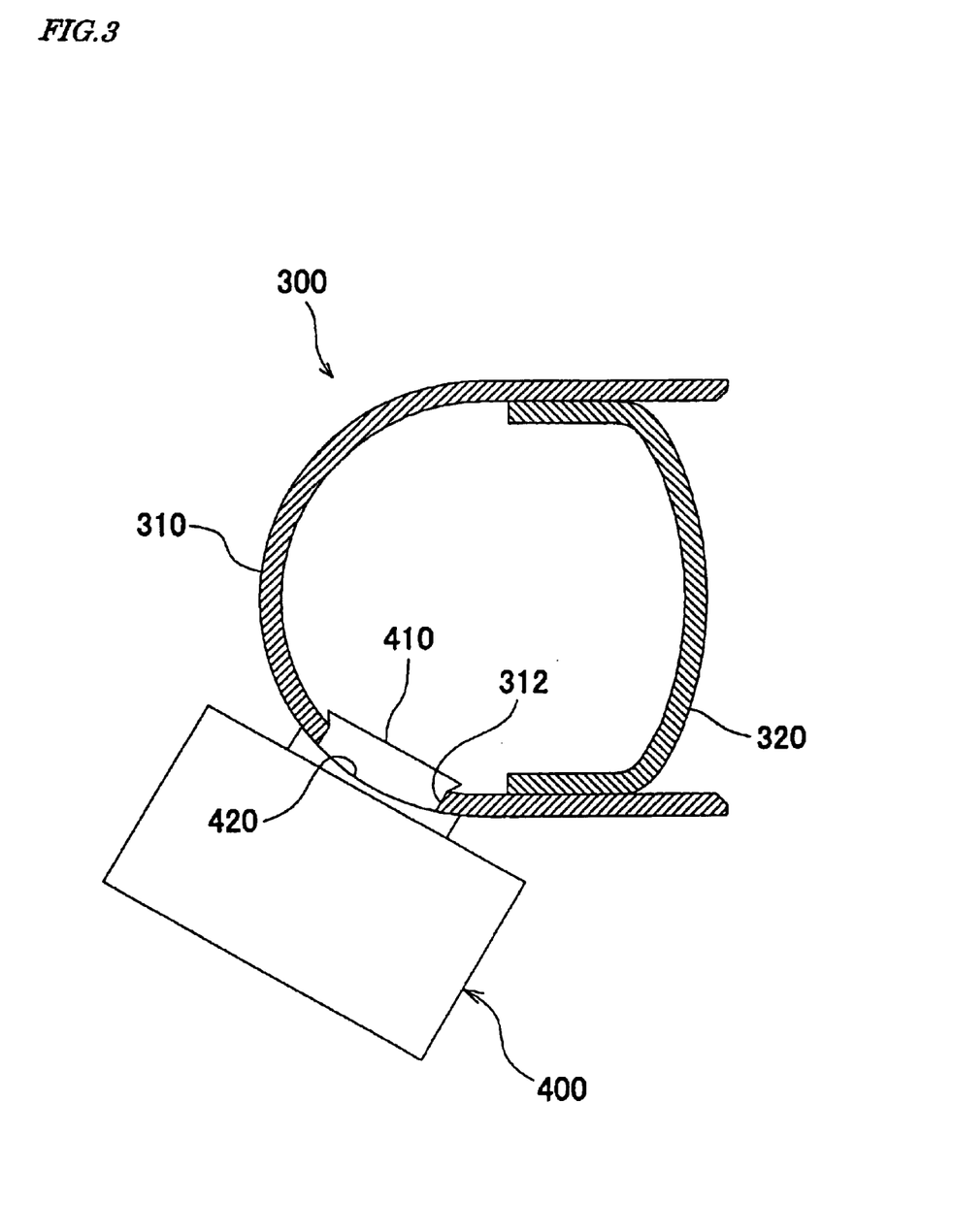
FIG. 3 is an explanatory diagram showing a tank and a connector according to an embodiment of the invention.
Figure 4:
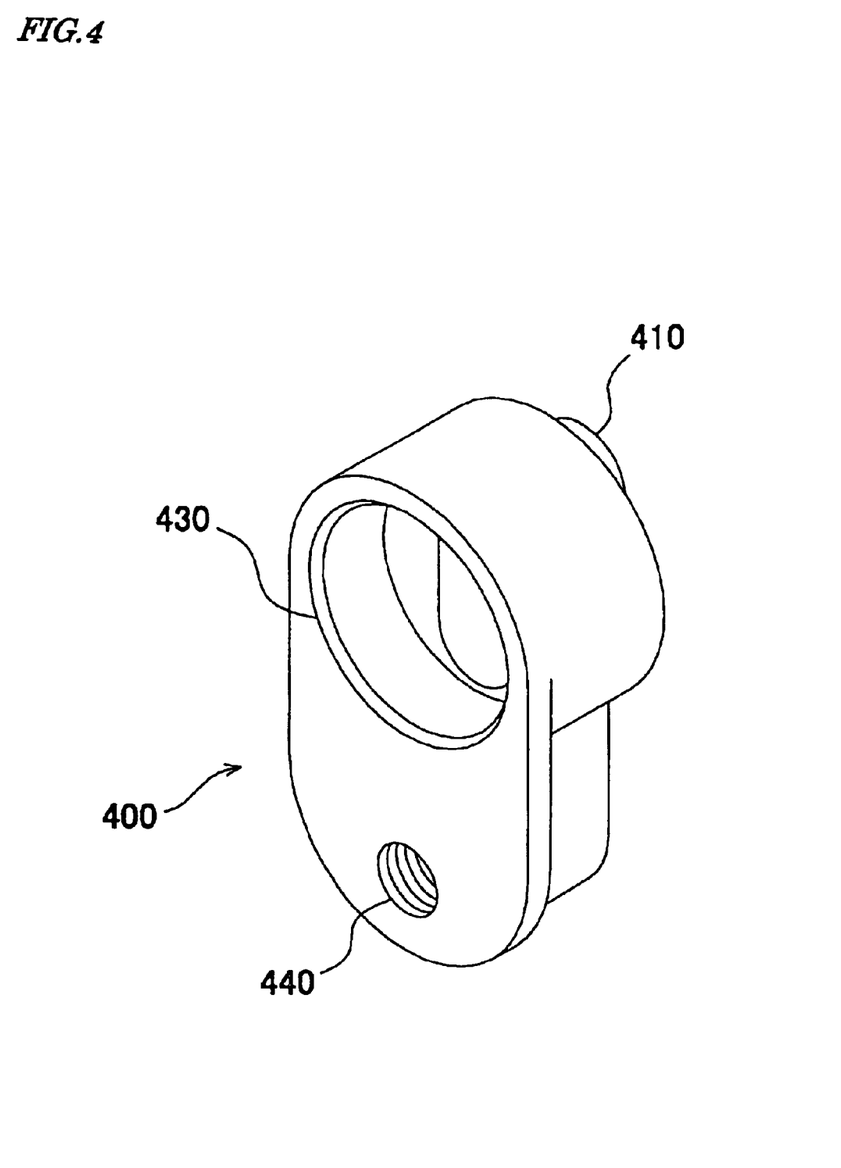
FIG. 4 is a front perspective view showing an inlet connector according to an embodiment of the invention.
Figure 5:
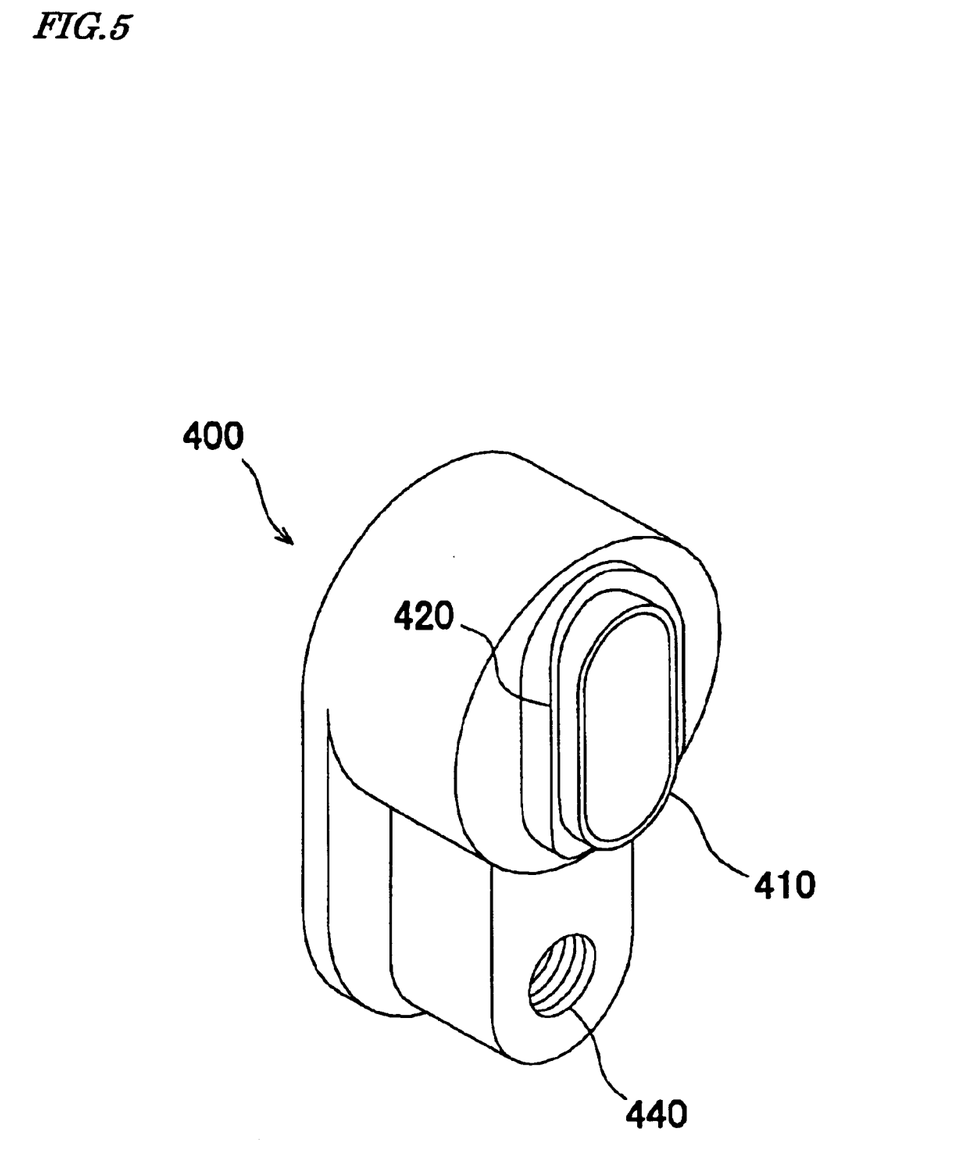
FIG. 5 is a rear perspective view showing the inlet connector according to the embodiment of the invention.

The inlet connector 400 is a block-shaped member which is formed by machining aluminum or its alloy into a prescribed shape and has a pipe section 410 which is inserted into the tank plate 310, a curved seating face 420 which is fitted to the outer surface of the tank plate 310, a connection section 430 for connecting an outer passage, and a bolt fitting portion 440 for screwing or inserting a bolt for connection of the outer passage as shown in FIG. 3 to FIG. 5. The pipe section 410 is protruded from the seating face 420.

And, the inlet connector 400 is disposed by inserting the pipe section 410 into the hole 312 formed in a required portion of the tank plate 310, brazing the pipe section 410 to the hole 312 and brazing the seating face 420 to the outer surface of the tank plate 310.

The pipe section 410, which is inserted into the hole 312 of the tank plate 310, has its leading end partly expanded. By expanding the leading end of the pipe section 410, the pipe section 410 is prevented from coming out, and the medium is flowed smoothly.

The tank plate 310 and the end plate 320 are assembled after inserting the pipe section 410 of the connector 400 into the tank plate 310.

In this embodiment, the inlet connector 400 has a surface area of 35 [cm$^2$] and a volume of 5.5 [cm$^3$]. And, aluminum or its alloy have a specific gravity of approximately 2.7 [g/cm$^3$], and the connector 400 weighs approximately 15 [g].

And, when the connector 400 is determined to have a surface area of X [cm$^2$] and a volume of Y [cm$^3$], $1.5 \cdot (36\pi Y^2)^{1/3} \approx 22.6$, $X \geq 1.5 \cdot (36\pi Y^2)^{1/3}$, and $Y \leq 30$ is established.

Therefore, the inlet connector 400 can be brazed efficiently by brazing in a furnace.

The relationship between the surface area and the volume depends on the structure, appearance and design of the connector 400, and the connector 400 is designed based on such a configuration.

On the other hand, the outlet connector 500 has a surface area of 21 [cm²] and a volume of 3.1 [cm³]. And, the connector 500 weighs approximately 8.4 [g]. The other structure is the same as the inlet connector 400 and, therefore, its description is omitted.

When it is determined that the connector 500 has a surface area of X [cm²] and a volume of Y [cm³], $1.5 \cdot (36\pi Y^2)^{1/3} \approx 15.4$, $X \geq 1.5 \cdot (36\pi Y^2)^{1/3}$, and $Y \leq 30$ is established.

Therefore, the outlet connector 500 can also be brazed efficiently by brazing in a furnace.

Figure 6:
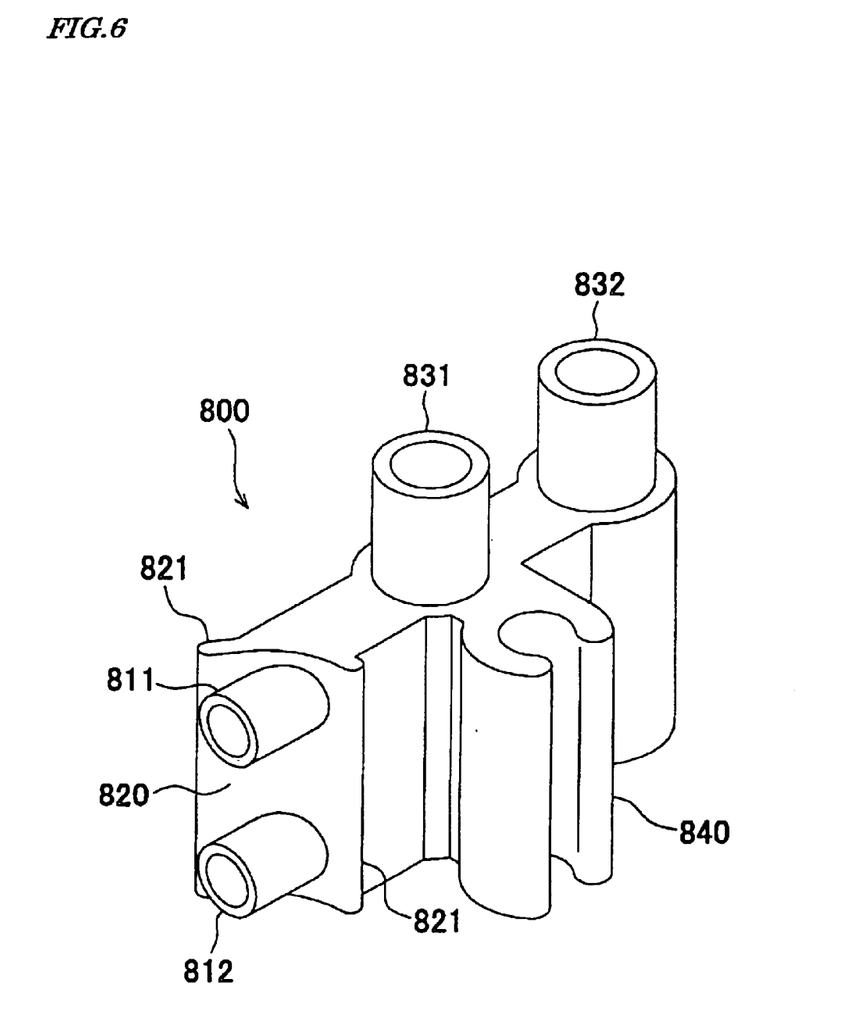
FIG. 6 is a perspective view showing a connector for connection of a gas-liquid separator according to an embodiment of the invention.

Besides, a connector 800 for connection of a gas-liquid separator of this embodiment is a block member formed by machining aluminum or its alloy into a prescribed shape and has one passage for flowing the medium from the tank 300 to the gas-liquid separator 700 and the other passage for flowing the medium from the gas-liquid separator 700 to the tank 300.

Specifically, the connector 800 has a seating face 820 which is brazed to the outer surface of the tank 300, a first pipe section 811 which is protruded from the seating face 820 to provide an inlet end of one passage into the tank 300, and a second pipe section 812 which is protruded from the seating face 820 to provide an outlet end of the other passage into the tank 300 as shown in FIG. 6.

The brazing area between the seating face 820 and the tank 300 is widened by flanges 821 formed on the required portions of the connector 800.

The tank plate 310 is formed with holes into which the first pipe section 811 and the second pipe section 812 are inserted.

Specifically, the connector 800 for connection of the gas-liquid separator has the first pipe section 811 and the second pipe section 812 protruded from the seating face 820 and inserted into the holes of the tank plate 310, the first pipe section 811 and the second pipe section 812 brazed to the holes by brazing in a furnace, and the seating face 820 brazed to the outer surface of the tank 300 to secure airtightness with the tank 300 and a supporting strength to the tank 300.

Besides, one of the above-described partition plates 330 is disposed between the hole into which the first pipe section 811 is inserted and the hole into which the second pipe section 812 is inserted in the tank 300.

And, this connector 800 is provided with a bolt attaching section 840 for insertion of a bolt, and the gas-liquid separator 700 is formed with a female thread section for screwing the bolt. The gas-liquid separator 700 is attached by screwing the bolt which is inserted into the bolt attaching section 840 into the female thread section.

When the gas-liquid separator 700 is attached, the outlet end of one passage is connected to the inlet section of the gas-liquid separator 700 through a third pipe section 831, the inlet end section of the other passage is connected to the outlet section of the gas-liquid separator 700 through a fourth pipe section 832.

The connector 800 for connection of the gas-liquid separator has a surface area of 60 [cm²] and a volume of 15.6 [cm³]. And, the connector 800 weighs approximately 42 [g].

When the connector 800 has a surface area of X [cm²] and a volume of Y [cm³], $1.5 \cdot (36\pi Y^2)^{1/3} \approx 45.3$, $X \geq 1.5 \cdot (36\pi Y^2)^{1/3}$, and $Y \leq 30$ is established.

Therefore, the connector 800 for connection of the gas-liquid separator can be brazed efficiently by brazing in a furnace.

The relationship between the surface area and the volume depends on the structure, appearance and design of the connector 800, and the connector 800 is also designed based on the above configuration.

As described above, in the heat exchanger of this embodiment, the inlet connector 400, the outlet connector 500 and the connector 800 for connection of the gas-liquid separator can be efficiently brazed to the tanks 300, and a rationalization of its production was achieved.

The heat exchanger 1 of the embodiment is a condenser for condensing the medium from a gas layer to a liquid layer, and the structures of the inlet connector and the outlet connector can also be applied to, for example, an evaporator, a radiator and another heat exchanger.

Especially, there is a refrigeration cycle adopting $CO_2$ as a medium in recent years, and its radiator's inside pressure exceeds the critical point of the medium depending on the use conditions such as a temperature. The critical point is a limit of a high temperature with the coexistence of the liquid layer and the gas layer, namely, of the limit on the side of high pressure.

And, when used as a radiator of such a refrigeration cycle, the inner pressure becomes very high, and, therefore a compressive strength of each member is improved by decreasing a passage area of the tanks or tubes for the refrigerant or increasing the thickness of the tank plate and the end plate.

The heat exchanger of this embodiment is preferably used for a radiator of such a refrigeration cycle.

INDUSTRIAL APPLICABILITY

The present invention is a heat exchanger generally used for a refrigeration cycle of a car or home air conditioner, and especially suitable for a refrigeration cycle which uses, for example, $CO_2$ as a refrigerant and having a pressure in the radiator exceeding the critical point of the refrigerant.

What is claimed is:

1. A heat exchanger which comprises tubes for flowing a medium, fins mounted on the tubes, tanks to which the ends of the tubes are connected and connectors disposed on the tanks, and performs heat exchange of the medium by heat conducted to the tubes and the fins, wherein:

the heat exchanger is formed by assembling the tubes, the fins, the tanks and the connectors and heating them in a furnace to braze into one body, the connectors are made of aluminum or its alloy and have a seating face to be brazed to the outer surface of the tanks, and the connectors have a surface area of X as measured in $cm^2$ and a volume of Y as measured in $cm^3$, where $X \geq 1.5 \cdot (36\pi Y^2)^{1/3}$, and $Y \leq 30$.

2. The heat exchanger according to claim 1, wherein the connector is provided with a pipe section which is protruded from the seating face for insertion into the tank.

3. The heat exchanger according to claim 1, wherein the connector is provided with a bolt attaching section for screwing or inserting a bolt for connecting of an outer passage.

4. The heat exchanger according to claim 2, wherein the connector is provided with a bolt attaching section for screwing or inserting a bolt for connecting of an outer passage.

* * * * *